United States Patent [19]

de Jonge et al.

[11] Patent Number: 4,980,444
[45] Date of Patent: Dec. 25, 1990

[54] AROMATIC AMIDE GROUPS-CONTAINING DIAMINES AND POLYMERS IN WHICH THESE DIAMINES ARE INCORPORATED

[75] Inventors: Cornelis R. H. I. de Jonge, Giesbeek; Gerrit Hoentjen, Westervoort; Eduard P. Magré, Heelsum, all of Netherlands

[73] Assignee: Akzo N.V., Arnhem, Netherlands

[21] Appl. No.: 372,327

[22] Filed: Jun. 28, 1989

Related U.S. Application Data

[62] Division of Ser. No. 120,931, Nov. 16, 1998, Pat. No. 4,851,562.

[30] Foreign Application Priority Data

Dec. 3, 1986 [NL] Netherlands .................. 8603079

[51] Int. Cl.$^5$ .................. C08G 18/32; C08G 69/26
[52] U.S. Cl. .................. 528/68; 528/347; 528/348; 528/342
[58] Field of Search .................. 560/19, 49, 50; 564/134, 153; 528/68, 347, 348, 229, 342

[56] References Cited

U.S. PATENT DOCUMENTS

| | | | |
|---|---|---|---|
| 3,049,518 | 8/1962 | Stephens | 528/68 |
| 3,926,923 | 12/1975 | Preston | 528/438 |
| 3,932,360 | 1/1976 | Cerankowski et al. | 528/68 |
| 4,122,026 | 10/1978 | Osman | 560/49 |
| 4,515,981 | 5/1985 | Otani et al. | 560/50 |
| 4,537,945 | 8/1985 | Otani et al. | 560/19 |
| 4,623,746 | 11/1986 | Kohli | 560/50 |

FOREIGN PATENT DOCUMENTS

| | | | |
|---|---|---|---|
| 120555 | 7/1982 | Japan | 560/50 |
| 123156 | 7/1982 | Japan | 560/19 |
| 53533 | 3/1984 | Japan | 560/50 |
| 212543 | 9/1986 | Japan | 560/19 |

OTHER PUBLICATIONS

Kirk-Othmer, Encyclopedia of Chemical Technology, 3rd Ed., vol. 3 (1978), pp. 229-237.
Yamazaki et al, Journal of Pol. Sci., vol. 13 (1975), pp. 1373-1380.

*Primary Examiner*—Morton Foelak
*Assistant Examiner*—Dennis R. Daley
*Attorney, Agent, or Firm*—Oliff & Berridge

[57] ABSTRACT

There is provided a new class of diamines of the formula

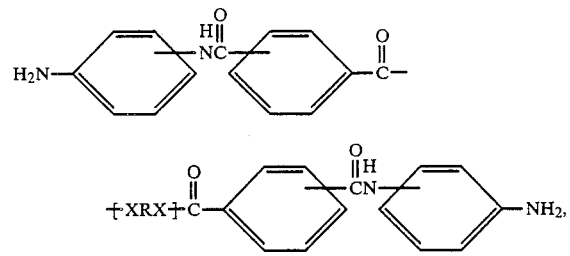

wherein X=NH or O, and R represents a divalent, substituted or unsubstituted organic group having at the most 20 carbon atoms.

The diamines, wherein X has the meaning of an O-atom, may be converted with diacids, diacid dichlorides, aromatic carboxylic acid anhydrides or diisocyanates into poly(esteraramid) amides, poly(esteraramid) imides, or poly(esteraramid) urea or, when X stands for an —NH-group, into poly(amidaramid) amides, poly(amidaramid) imides, or poly(amidaramid) urea.

The wholly or largely aromatic polyamides, polyurea or polyimides are of an iterative structure. They can be melt-processed into shaped objects displaying a very good resistance to high temperatures, particularly when use is made of diamines having meta-substituted amide groups or diamines of a non-aromatic structure for the —XRX— group, or of a non-aromatic structure of the diacids, diacid dichlorides, aromatic carboxylic acid anhydrides or diisocyanates to be linked to the diamines. By altering the chemical structure of the diamines on the one hand and the diamine-linkable bifunctional compounds on the other, both the melting performance and the level of crystallinity of the end product may be influenced.

14 Claims, No Drawings

AROMATIC AMIDE GROUPS-CONTAINING DIAMINES AND POLYMERS IN WHICH THESE DIAMINES ARE INCORPORATED

This is a Division of application Ser. No. 07/120,931 filed Nov. 16, 1987 now U.S. Pat. No. 4,851,562.

The invention relates to diamines of the formula

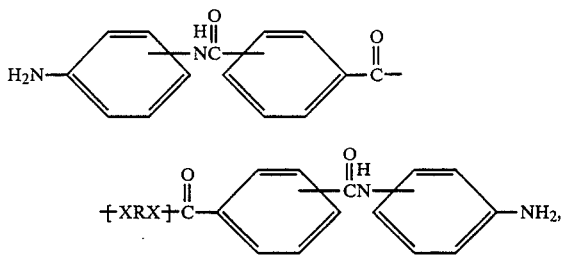

wherein X=NH or O, and R represents a divalent, substituted or unsubstituted organic group having at the most 20 carbon atoms. The invention also relates to a process for the preparation of these diamines, as well as poly(esteraramid) amides, poly(esteraramid) imides, poly(esteraramid) urea, poly(amidaramid) amides, poly(amidaramid) imides, and poly(amidaramid) urea incorporating these diamines by conversion of the diamines with diacids, diacid dichlorides, aromatic carboxylic acid anhydrides or diisocyanates.

Polymers having aromatic amide groups are generally known. They are used primarily because of their great strength combined with a very good resistance to high temperatures. A major disadvantage of these polymers is that they are generally not suited to be melt processed.

Therefore, U.S. Pat. No. 3,926,923 proposes the use of copolymers with part of the aromatic amide groups-containing segments being replaced with groups of an aliphatic structure. However, a major disadvantage of these copolymers is their random structure, which is due to "at random" copolymerization. In general, this results in polymers of which the preparation is difficult to reproduce.

Finally, it should be noted that the preparation of an aromatic amide groups-containing diamine as precursor in the preparation of aromatic amide groups-containing polymers was in itself already known from U.S. Pat. No. 3,049,518. The preparation of the only diamine described therein, viz. N,N'-bis(3-aminophenyl)-isophthalamide, is, however, found to be attended with the formation of a high percentage of by-products, in particular low-molecular weight polymer.

The use of diamines of the above structure will result in obtaining wholly or largely aromatic polyamides, polyurea or polyimides of an iterative structure, which can be melt-processed into shaped objects displaying a very good resistance to high temperatures, particularly when use is made of diamines having meta-substituted amide groups or diamines of a non-aromatic structure for the —XRX— group, or of a non-aromatic structure of the diacids, diacid dichlorides, aromatic carboxylic acid anhydrides or diisocyanates to be linked to the diamines. By altering the chemical structure of the diamines on the one hand and the diamine-linkable bifunctional compounds on the other, both the melting performance and the level of crystallinity of the end product may be influenced.

Apart from said homopolymers, copolymers may of course be prepared in which the diamines according to the invention are replaced in part with other diamines of an aliphatic or aromatic structure, or copolymers may be prepared from mixtures of diacids, diacid dichlorides, aromatic carboxylic acid anhydrides or diisocyanates. Alternatively, copolymers may be obtained by using a mixture of diamines according to the invention.

It has been shown in actual practice that polymers with highly satisfactory properties may be obtained by using a diamine of said formula with the R group representing an alkylene group having 2–10 carbon atoms. As examples of suitable alkylene groups may be mentioned ethylene, butylene and hexamethylene as well as such branched-structure alkylene groups as neopentylene, isobutylene, and isooctylene or 2-ethylhexylene.

Alternatively, R may represent a cycloaliphatic structure such as cyclohexylene or 1,4-dimethylene cyclohexylene or it may represent an aromatic group such as an m- or p-phenylene group.

If in the diamine formula all amide groups are in the p-position, and R is to stand for a p-phenylene group and X for an —NH-group, and if the resulting diamine is polymerized with terephthaloyl dichloride, the resulting product will be the non-melting poly-p-phenylene terephthalamide, which is suited only to be processed into pulp or into the well-known polyaramid fibres. If, however, all amide groups are in the m-position, with R standing for an m-phenylene group and X for an —NH-group, then polymerization with isophthaloyl dichloride will result in poly-m-phenylene isophthaloyl amide, which will not melt either without thermal decomposition and which is used in the electrotechnical industry on account of its favourable dielectric properties combined with a very good resistance to high temperatures.

Naturally, the advantages of the present invention will only fully manifest themselves when a polymer processable via the melt is obtained by a certain selection from the group —XRX—, m- or p-substitution and from the diacid, diacid dichloride, diisocyanate, or carboxylic acid anhydride used in polymerization.

Polymers of superior properties may be obtained from a diamine having the above formula, wherein R represents the group

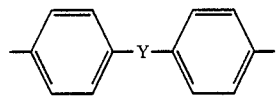

wherein Y has the meaning of a linear or branched alkylene group having 1–4 carbon atoms,

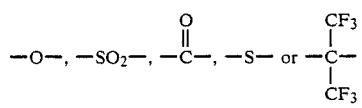

Polymers having very good properties may also be obtained by making use of a diamine of said formula wherein R represents the group

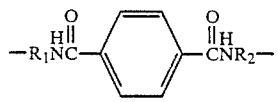

wherein $R_1$ and $R_2$ may be the same or different and represent a branched or unbranched alkylidene group having 2 to 5 carbon atoms. Preference is then given to a polymer derived from a diamine in which $R_1$ and $R_2$ both have the meaning of an ethylene group and X represents an O-atom.

The invention also provides a process for the preparation of diamines according to the above formula, in which process use is made of procedures known in themselves from chemical technology for converting the acid chloride of a half ester of terephthalic acid or isophthalic acid with m- or p-nitroaniline, the resulting reaction product is trans-esterified with a bifunctional alcohol of the formula HOROH, or converted therewith or with a diamine of the formula $H_2NRNH_2$, after hydrolysis and chlorination, the resulting dinitro compound is reduced with hydrogen to the corresponding diamine, which diamine is then isolated.

In actual practice the procedure is as follows: first the half ester is prepared from: dimethyl isophthalate or dimethyl terephthalate by controlled saponification with a solution of KOH in methanol. The resulting precipitate is dissolved in hot water subsequent to filtration, followed by acidification, filtration and recrystallization to obtain the corresponding half ester in the pure state. The half ester thus prepared is next converted into the corresponding carbomethoxybenzoyl chloride using an excess of thionyl chloride.

For the preparation of the nitrobenzanilide ester therefrom a solution of a nitroaniline in dimethylacetamide is converted in the presence of pyridine as acid binder with a stoichiometric amount of 3- or 4-carbomethoxybenzoyl chloride in dimethylacetamide. Subsequent to pouring into ice water, filtering, and washing with water and methanol, and subsequent to drying a product is obtained which is converted with a divalent alcohol and/or amine into the corresponding dinitro compound. The conversion by transesterification may be carried out for instance by boiling with refluxing in the presence of both the alcohol and a solvent such as o-dichlorobenzene and of an organic titanium catalyst such as tetraisopropyl orthotitanate. Conversion with an alcohol or a diamine may also be effected by chlorinating the resulting acid—optionally in situ—after hydrolysis of the ester, followed by the addition of the diol or the diamine in dimethylacetamide in the presence of an acid acceptor such as pyridine. On conclusion of the reaction the reaction mixture is poured into ice water, the precipitate is washed thoroughly with water and methanol, and dried.

Under certain conditions, especially when of the group —XRX— X has the meaning of

and R of alkylene, the process above-discussed does not always have the desired result.

For that reason the invention provides an alternative process, whereby with methods known in themselves from chemical technology the acid chloride of a half ester of terephthalic acid or isophthalic acid is converted with a bifunctional alcohol of the formula HOROH or with a diamine of the formula $H_2NRNH_2$ in the presence of an acid binder, the resulting diester is hydrolyzed to the corresponding diacid, and the diacid is converted with m- or p-nitroaniline, after which the resulting dinitro compound is reduced with hydrogen to the corresponding diamine, which diamine is then isolated.

The conversion with m- or p-nitroaniline is preferably carried out in the presence of a solution of lithium chloride in a mixture of N-methyl pyrrolidone, pyridine and triphenyl phosphite.

The resulting dinitro compound is finally subjected to a catalytic hydrogenation process to obtain a diamine having the structure of the above formula. As examples of suitable solvents for the hydrogenation reaction may be mentioned dimethylacetamide, hexamethyl phosphoric triamide or N-methyl pyrrolidone. Further reaction conditions such as hydrogen pressure, reaction temperature and the total amount of hydrogen to be added should be carefully controlled so as to avoid overhydrogenation. On conclusion of the hydrogenation reaction the reaction product is separated from the catalyst suspension by filtration and purified by recrystallization from dimethylacetamide. The resulting diamines, wherein X has the meaning of an O-atom, may be used in the preparation of poly(esteraramid) amides, poly(esteraramid) imides, or poly(esteraramid) urea or, when X stands for an —NH-group, of poly(amidaramid) amides, poly(amidaramid) imides, or poly(amidaramid) urea. The preparation of poly(esteraramid) amides or poly(amidaramid) amides according to the invention may be carried out analogous to the method described for the well-known polyaramids in Kirk-Othmer, Encyclopedia of Chemical Technology, 3rd Ed. Vol. 3 (1978), pp. 229–237.

In the preparation on a laboratory scale advantageous use may be made of a method described by Yamazaki et al. in the Journal of Pol. Sci., Vol. 13 (1975), pp. 1373–1380. In the case of preparation on an industrial scale preference is generally given to interfacial polymerization or polymerization from the solution.

In interfacial polymerization the acid is dissolved or dispersed in an inert, water-immiscible organic solvent, preferably a swelling agent for the polymer, and the diamine is dissolved or dispersed with a proton acceptor in the aqueous phase. Next, the system is preferably quickly stirred, after which the polymer is collected and dried.

For polymerization in solution preference is given to polycondensation of diacid dichlorides and diamines in amide groups-containing solvents. In the case of solvent polymerization the polymerization medium acts as a solvent for at least one of the reaction components and as a solvent or swelling agent for the polymer. In order that the reaction may be as nearly complete as possible an acid acceptor, usually a tertiary amine, is used. As suitable solvents may be mentioned dimethyl acetamide, N-methyl pyrrolidone and tetramethylurea. To enhance the dissolving power use is generally made of inorganic salts such as lithium chloride and calcium chloride.

As diacid dichlorides generally suitable for the preparation of poly(esteraramid) amides or poly(amidaramid) amides may be mentioned compounds of the formula A—Q—A, wherein A has the meaning of a carbonyl chloride group and Q represents a divalent organic group with 2-40 carbon atoms. Generally, compounds are preferred wherein Q stands for an m- or p-phenylene group, an alkylene group having 2-8 carbon atoms or a cyclohexylene or dimethylene cyclohexylene group. As examples of diacid dichlorides which may be reacted with the diamines according to the present invention to form the aforementioned compounds may be mentioned adipoyl dichloride, sebacoyl dichloride, cyclohexane-1,4-dicarbonyl dichloride, cyclobutane-1,3-dicarbonyl dichloride, isophthaloyl dichloride, bibenzoyl dichloride, 2,6-naphthalene dicarbonyl dichloride, 1,1,3-trimethyl-3-phenylindane-4', 5-dicarbonyl dichloride, oxaloyl dichloride, fumaroyl dichloride and diacid dichlorides of the formula

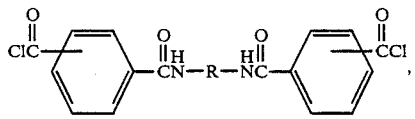

wherein R has the same meaning as given in the first formula.

The preparation of poly(esteraramid) imides and poly(amidaramid) imides may be carried out by converting the diamines in question with an aromatic carboxylic acid anhydride having 9 to 24 carbon atoms to form a poly(esteraramid) amide and poly(amidaramid) amide, respectively, followed by heating at a temperature in the range of 150° to 300° C. to form the respective imides.

In the conversion use is preferably made of an aprotic solvent such as dimethylacetamide.

According to the invention preference is generally given to a method of preparation in which for the carboxylic acid anhydride is used trimellitic acid anhydride, pyromellitic acid dianhydride, and in particular benzophenone tetracarboxylic acid dianhydride. Finally, the diamines according to the invention may be converted with an equivalent amount of maleic acid anhydride to form the corresponding diimides. In their turn these diimides may be converted with an equivalent amount of diamine while forming the corresponding polyimides.

An advantage of the latter process is the absence of volatile by-products.

Preparation of poly(esteraramid) urea and poly(amidaramid) urea may take place by conversion of the diamines with a diisocyanate of the formula OCN—Q—NCO, wherein Q stands for a divalent organic group having 2-20 carbon atoms. Preferably use is made in the conversion of a solvent such as N-methyl pyrrolidone. According to the invention a method of preparation is commonly preferred in which use is made of a diisocyanate of the above formula wherein Q represents a divalent aliphatic, alicyclic or aromatic group.

As suitable diisocyanates for conversion according to the present invention into said poly(esteraramid) urea and poly(amidaramid) urea may be mentioned: hexamethylene diisocyanate, dimethyl hexamethylene diisocyanate, trimethyl hexamethylene diisocyanate, m-xylylene diisocyanate, and tetramethylene diisocyanate.

When Q stands for an aromatic group, this group may be substituted with halogen or a lower alkyl or alkoxy group. Examples include: 1-chloro-2,4-phenylene diisocyanate, 2,4-toluene diisocyanate, a mixture of 2,4- and 1,6-toluene diisocyanate, tetramethylphenylene diisocyanate, diphenylmethane-4,4'-diisocyanate, m-phenylene diisocyanate, p-phenylene diisocyanate, diphenyl-4,4'-diisocyanate, biphenylmethane-4,4'-diisocyanate, biphenyl dimethylmethane-4,4'-diisocyanate, benzophenone-4,4'-diisocyanate, biphenyl ether diisocyanate, 3,3'-dimethyldiphenyl-4,4'-diisocyanate and benzofuran-2,7-diisocyanate.

As examples of diisocyanates having an alicyclic group may be mentioned: isophorone diisocyanate, dicyclohexylmethane diisocyanate and 1,4-cyclohexane diisocyanate.

In general, the polymers according to the invention may be melt-processed into shaped articles by prior art methods used for polymers resistant to high temperatures. In this way also very strong films and fibres may be made. Alternatively, fibres may be obtained by the wet spinning process known to be used for wholly aromatic polyamides.

The invention will be further described in, but not limited by the following examples.

EXAMPLE I

Preparation of the monomethyl ester of terephthalic acid

In a 3-liter 3-necked flask, fitted with a mechanical stirrer, a reflux condenser and a dropping funnel were 194 g (1 mole) of dimethyl terephthalate (DMT) in 2 liters of methanol, with the DMT not fully dissolving in the methanol. Over a period of 50 minutes there were added 64.2 g (1 mole) of KOH (88%) dissolved in 300 ml of methanol. A white precipitate was formed. After all the ingredients had been added, stirring was continued for another 90 minutes. After cooling to 30°-35° C. the precipitate was isolated by filtration and dissolved in hot water of 90° C. Following hot filtration the solution was acidified with 4N HCl, leading to the formation of a white precipitate. After filtration, recrystallization, and drying at 60° C. in vacuo 116.5 g of the present product were obtained in a yield of 65%. The melting point was 219.3°-219.9° C.

EXAMPLE II

Preparation of the monomethyl ester of isophthalic acid

The method of preparation described in Example I was repeated, except that use was made of dimethyl isophthalate (DMI) in an amount of 48.5 g (0.25 moles) in 150 ml of methanol. After stirring and heating to 35° C. the DMI completely dissolves. To this solution there was added over a period of 30 minutes at 35° C. a solution of 16 g (0.25 moles) of KOH (88%) in 80 ml of methanol. After 90 minutes' stirring and cooling to 8° C. a precipitate was formed, which continued to grow on heating to 40° C. Following filtration and washing with diethyl ether (to remove non-converted DMI) a white cake was obtained. After dissolving in water and acidification with 4NHCl 34.7 g of monomethyl ester were obtained in a yield of 75%. The melting point of the monomethyl ester of isophthalic acid was 186°-191° C.

EXAMPLE III

Preparation of 4-carbomethoxybenzoyl chloride

Into a 1-liter 3-necked flask fitted with a mechanical stirrer, a reflux condenser and a thermometer were introduced 540 g (3 moles) of the monomethyl ester of terephthalic acid and 500 g (4,2 moles) of thionyl chloride. After heating to 80° C. a clear solution of 4-carbomethoxybenzoyl chloride and an excess of thionyl chloride were obtained after 6 hours. Following the removal of the thionyl chloride the residue was distilled in vacuo. Obtained were 586 g of said product in a yield of 98%. The boiling point was 140° C. at 1.47 kPa.

EXAMPLE IV

Preparation of 3-carbomethoxybenzoyl chloride

Into a 250 ml 3-necked flask fitted with a magnetic stirrer, a reflux condenser and a thermometer were introduced 61.0 g of the monomethyl ester of isophthalic acid (0.33 moles) and 64 g of thionyl chloride (0.54 moles). After heating to 75° C. a clear solution was obtained after 1 hour. Obtained were 64.0 g of 3-carbomethoxybenzoyl chloride, which corresponds to a yield of 97%.

EXAMPLE V

Preparation of methyl-3-(p-nitrophenylcarbamoyl) benzoate

In a 1-liter 3-necked flask fitted with an inlet tube for nitrogen, a magnetic stirrer, a dropping funnel and a thermometer there were introduced 76 g (0.5 moles) of p-nitroaniline in 600 ml of dimethylacetamide and 80 ml of pyridine. (Both solvents had previously been dried over a molecular sieve 3A). Over a period of 45 minutes 99.2 g (0.5 moles) of 3-carbomethoxybenzoyl chloride in 100 ml of dimethylacetamide were added with stirring and cooling, care being taken that the temperature did not rise to above 15° C. In the process a yellow precipitate was formed. After all the ingredients had been added, stirring was continued for 1 more hour at 20° C. The reaction mixture was poured into 2 l of ice water, filtered, washed 6 times with water and finally with methanol. After drying at 70° C. and a pressure of 133 Pa 146 g of the envisaged product were obtained in a yield of 97%. The melting point was 206°-207.6° C. In an analogous manner there were prepared:

|  | Melting point °C. |
| --- | --- |
| methyl-3-(m-nitrophenylcarbamoyl) benzoate | 160.0-162.7 |
| methyl-4-(m-nitrophenylcarbamoyl) benzoate | 179.8-181.3 |
| methyl-4-(p-nitrophenylcarbamoyl) benzoate | 231.2-231.5 |

EXAMPLE VI

Preparation of O,O'-bis[3-(m-nitrophenylcarbamoyl)benzoyl]hexamethylene glycol

Into a 500 ml 3-necked flask fitted with a magnetic stirrer, an inlet tube for $N_2$, a thermometer and a Soxhlet apparatus with reflux condenser were introduced 30 g of methyl-3-(m-nitrophenylcarbamoyl)benzoate (0.1 mole), 6 g (0.05 moles) of hexane diol-1,6, 300 ml of dry o-dichlorobenzene and 3 drops of tetraisopropylorthotitanate (TIPOT). The reaction mixture was stirred for 3 hours at 170°-180° C. The methanol released was bound by molecular sieves 4Å in the Soxhlet apparatus. After cooling the precipitate was isolated by filtration, washed with methanol and pentane and then dried for 24 hours at 70° C. and 65 Pa.

Obtained were 29.9 g of the envisaged product in a yield of 91%. The melting point was 214°-217.0° C.

In an analogous manner there were prepared:
O,O'-bis[4-(p-nitrophenylcarbamoyl)benzoyl] hexamethylene glycol with a melting point of 264.1°-266.3° C.
O,O'-bis[4-(m-nitrophenylcarbamoyl)benzoyl] hexamethylene glycol with a melting point of 220.3°-220.8° C.
O,O'-bis[3-(p-nitrophenylcarbamoyl)benzoyl] hexamethylene glycol with a melting point of 187.0°-191.0° C.

EXAMPLE VII

Preparation of O,O'-bis[4-(m-aminophenylcarbamoyl)benzoyl] hexamethylene glycol[(A)] according to the invention.

In a 250 ml Hofer autoclave were introduced 30 g of O,O'-bis[4-(m-nitrophenylcarbamoyl)benzoyl] hexamethylene glycol in 150 ml of dimethylacetamide together with 3.0 g of Raney Ni suspension in water. The reduction was carried out at a temperature of between 70° and 100° C. and an initial hydrogen pressure of 4000 KPa. After 2 hours the reduction was complete and the reaction mixture—after filtration of the Raney Ni—was poured into 1.5 l of ice water. A pale pink precipitate was formed which, after recrystallization from n-butanol, resulted in 25 g of the envisaged compound in a yield of 91%. The melting point was found to be 220.3°-220.8° C. In an analogous manner there were prepared:
O,O'-bis[3-(m-aminophenylcarbamoyl)benzoyl] hexamethylene glycol[(B)] with a melting point of 167°-170° C.
O,O'-bis[4-(p-aminophenylcarbamoyl)benzoyl] hexamethylene glycol[(C)] with a melting point of 264.1°-266.3° C.
O,O'-bis[3-(p-aminophenylcarbamoyl)benzoyl] hexamethylene glycol[(D)] with a melting point of 187°-191° C.

EXAMPLE VIII

Preparation of O,O'-bis[3-(p-aminophenylcarbamoyl)benzoyl] ethylene glycol[(E)],
O,O'-bis[4-(m-aminophenylcarbamoyl)benzoyl] neopenntyl glycol[(G)], and
O,O'-bis[3-(m-aminophenylcarbamoyl)benzoyl] bisphenol-A[(F)]

For the preparation of these diamines were used methyl-3-(p-nitrophenylcarbamoyl)benzoate, methyl-4(m-nitrophenylcarbamoyl)benzoate, and methyl-3-(m-nitrophenylcarbamoyl) benzoate, respectively, the preparation of which is given in Example V. After saponification of the respective methyl esters with 2 moles of base per mole of ester, acidification, and chlorination of the carboxyl group with thionyl chloride, the respective acid chlorides were converted with ethylene glycol, neopentyl glycol and bisphenol A, respectively, into the corresponding dinitro compounds. After reduction with hydrogen the envisaged compounds were obtained.

EXAMPLE IX a. Preparation of 4-(m-nitrophenylcarbamoyl)benzoic acid

Into a 10 l flask fitted with an inlet tube for nitrogen, a mechanical stirrer, a dropping funnel, and a thermometer were introduced at room temperature 500 g (1.66 moles) of methyl-4-(m-nitrophenylcarbamoyl)benzoate in 4 l of dimethylacetamide. To the yellow solution there was added dropwise with stirring and cooling a solution of 231 g (85%) of KOH (3.5 moles) in 1 l of methanol. Subsequently, the orange solution was stirred for another hour at 60° C. Next, the reaction mixture was acidified with a dilute solution of hydrochloric acid. The resulting precipitate was filtered, washed with water, and dried in vacuo. Obtained were 457 g of the envisaged product with a melting point of 319° C. (DSC) in a yield of 96%.

b. Preparation of N,N'-bis[4-(m-nitrophenylcarbamoyl)benzoyl] oxydianiline

Into a 6 l, 3-necked flask fitted with an inlet tube for nitrogen, a mechanical stirrer, a thermometer, a reflux condenser, and a dropping funnel were introduced 286 g (1 mole) of 4-(m-nitrophenylcarbamoyl)benzoic acid and 100 g of oxydianiline together with 311 g of triphenyl phosphite and 1.6 l of Yamazaki reagent (a solution of 1.4 l of N-methyl pyrrolidone, 1.07 l of pyridine, and 100 g of lithium chloride). The reaction mixture was slowly heated to 83° C. and kept at this temperature for 2 hours. After cooling to room temperature the reaction mixture was slowly diluted with methanol until a volume of 5 l was obtained. The resulting precipitate was filtered, washed thoroughly with methanol, and dried in vacuo.

Obtained were 345 g of the envisaged product with a melting point of 332° C. (DSC) in a yield of 96%.

c. Preparation of N,N'-bis[4-(m-nitrophenylcarbamoyl)benzoyl] ethylene diamine Into a 3 l 3-necked flask fitted with an inlet tube for nitrogen, a mechanical stirrer, a reflux condenser, and a dropping funnel were introduced 80 g (0.21 moles) of N,N'-bis(p-carbomethoxybenzoyl)ethylene diamine (obtained by reacting 1 equivalent of ethylene diamine with 2 equivalents of p-carbomethoxybenzoyl chloride) with 400 ml of dimethylacetamide and 400 ml of water. To this was added dropwise a solution of 30 g (85%) of KOH in 500 ml of methanol. The reaction mixture was then stirred for 2.5 hours at a temperature of 70° C. After cooling to room temperature dilute hydrochloric acid was added. The precipitate was filtered, washed several times with water, and dried for 24 hours at 80° C. and a pressure of 1.6 kPa, and subsequently dried again at 90° C. and a pressure of 53 Pa.

Obtained were 74 g of diacid with a melting point of 352° C. in a yield of 99%.

Of this diacid 73.6 g (0.206 moles) were introduced with 58.0 g (0.42 moles) of m-nitroaniline, 160 g of triphenyl phosphite, and 800 ml of Yamazaki reagent (a solution of 1.4 l N-methyl pyrrolidone, 1.07 l of pyridine, and 100 g of lithium chloride) into a 3 l 3-necked flask fitted with an inlet tube for nitrogen, a mechanical stirrer, a reflux condenser, and a dropping funnel. Over a period of 75 minutes the temperature was slowly increased to 85° C. Next, stirring took place for a further 3 hours. After cooling to room temperature there were slowly added to the mixture 1200 ml of methanol. The resulting precipitate was filtered, washed with methanol, and dried in vacuo. Obtained were 119 g (97%) of the envisaged product with a melting point of 365° C. (DSC).

d. Preparation of N,N'-bis[4-(m-aminophenylcarbamoyl)benzoyl] ethylene diamine (K)

The preparation of this compound was carried out as indicated in Example VII for the preparation of compound (A). In an analogous manner there were prepared:

N,N'-bis[4-(m-aminophenylcarbamoyl)benzoyl] propylene diamine-1,3 (L),
N,N'-bis[4-(m-aminophenylcarbamoyl)benzoyl] decamethylenediamine-1,10 (M), and N,N'-bis[4-(m-aminophenylcarbamoyl)benzoyl] oxydianiline (N).

EXAMPLE X

Preparation of a number of poly(esteraramid) amides from O,O'-bis-[4(m-aminophenylcarbamoyl)benzoyl] hexamethylene glycol, the preparation of which is discussed in Example VII (diamine A), and from isophthalic acid (IFT), adipic acid (ADP), 1,1,3-trimethyl-3-phenylindane-4'5-dicarboxylic acid (PIDA), 1,7-heptane dicarboxylic acid (HPC), 1,10-decane dicarboxylic acid (DCD), 5-tertiary butyl isophthalic acid (TIFT), 2,6-naphthalenedicarboxylic acid (NAD), and terephthalic acid (TFT), respectively.

Into a 500 ml, 3-necked flask fitted with a glass stirrer, an inlet tube for $N_2$, a thermometer, a reflux condenser and a dropping funnel there were successively introduced:

29.7 g of diamine A (0.05 moles),
8.3 g of isophthalic acid (0.05 moles),
7 g of lithium chloride,
32 g of triphenyl phosphite,
100 ml of N-methyl pyrrolidone (dried on molecular sieves 3Å) and
75 ml of pyridine Following the removal of all oxygen by the passage of nitrogen, the mixture was slowly heated to 80° C., with stirring. After a reaction period of 4.5 hours the reaction mixture was cooled to room temperature and subsequently 250 ml of methanol were added dropwise to the viscous polymer solution. After several washings with methanol in a "waring blender" the polymer solution was dried in vacuo. The polymer having as recurring unit-A-IFT-was obtained in a yield of 99% of theory. The measured relative viscosity, measured in an Ubbelohde viscosimeter at 25° C. on a solution of 0.5 g of polymer in 100 ml of solvent consisting of dimethylacetamide (DMA) in which per liter 50 g of LiCl were dissolved, amounted to 1.87 which corresponds to $\eta_{inh} = 1.25$.

The results of the remaining measurements conducted on this polymer are shown in Table I below.

The TGA and DSC (Differential Scanning Calorimetry) data given in the table were determined in a nitrogen atmosphere at a heating rate of 10° C./minute using a Du Pont Thermal Analyser. In this table $T_g$ stands for the glass transition temperature, $T_m$ for the melting point, and $T_d$ for the decomposition temperature.

On repetition of the polymerization using each time one of the aforementioned diacids there were obtained polymers having the following properties given in the table below.

TABLE I

| Polymer having for a recurring unit | TGA loss of weight 0% at temperature in °C. | TGA loss of weight 10% at temperature in °C. | DSC in °C. $T_g$ | DSC in °C. $T_m$ | DSC in °C. $T_d$ | ηrel (0,5%) (DMA/LiCl) | ηinh |
|---|---|---|---|---|---|---|---|
| -A-IFT- | 345 | 385 | 202 | { 325, 360 } | 360 | 1.87 | 1.26 |
| -A-ADP- | 320 | 385 | 154 | { 260, 312 } | 330 | 1.97 | 1.36 |
| -A-HPC- | 340 | — | 133 | { 235, 250 } | 315 | 1.98 | 1.37 |
| -A-DCD- | 330 | 390 | 132 | 260 | 320 | 2.62 | 1.93 |
| -A-TIFT- | 345 | 385 | 213 | — | 350 | 1.96 | 1.35 |
| -A-PIDA- | 360 | 390 | 225 | — | 350 | 1.79 | 1.16 |
| -A-NAD- | 345 | 375 | 210 | 360 | 370 | 4.10 | 2.82 |
| -A-TFT- | 345 | 385 | — | 365 | 370 | 2.26 | 1.63 |

EXAMPLE XI

In this example the physical properties are given of polymers obtained by the polymerization of the diamines A through G (prepared in the examples VII and VIII) with terephthalic acid (TFT), isophtalic acid (IFT), 1,1,3-trimethyl-3-phenylindane-4',5-dicarboxylic acid (PIDA) or adipic acid (ADP). With the exception of polymer C-TFT, in the preparation of which acid dichloride was used, all other polymers were prepared from the diamine and the diacid according to the method of Yamazaki et al. as described in the J. Pol. Sci. Pol. Chem. Ed. 13, 1373 (1975). The results of the tests are given in the table below.

TABLE II

| Polymer having for a recurring unit | TGA loss of weight 0% at temp in °C. | TGA loss of weight 10% at temp in °C. | DSC in °C. $T_g$ | DSC in °C. $T_m$ | DSC in °C. $T_d$ |
|---|---|---|---|---|---|
| -C-TFT- | 360 | 410 | | | |
| -D-IFT- | 335 | 385 | 192 | 359 | |
| -B-IFT- | 350 | 385 | 167 | 298 | |
| -D-ADP- | 300 | 380 | 180 | 316 | |
| | | | | 340 | |
| | | | | 223 | |
| -B-ADP- | 320 | 360 | 137 | 261 | |
| -F-IFT- | 325 | 400 | 223 | — | |
| -F-ADP- | 310 | 360 | 171 | — | |
| -E-IFT- | 325 | 440 | | 307 | |
| -E-ADP- | 320 | 360 | 168 | 296 | |
| -D-PIDA- | 330 | 380 | 219 | — | |
| -G-IFT- | 364 | 420 | 232 | 335 | 350 |
| -G-PIDA- | 375 | 445 | 235 | — | |
| -G-ADP- | 320 | 405 | 180 | 262 | 330 |

EXAMPLE XII

In a manner analogous to the one given in Example X poly(amidaramid) amides were prepared from the diamines K, L, M, and N of Example IX and the following diacids and diacid dichlorides, respectively:
terephthalic acid (TFT)
isophtalic acid (IFT)
5-tertiary butyl isophthalic acid (TIFT)
1,1,3-trimethyl-3-phenylindane-4',5-dicarboxylic acid (PIDA)
2,6-naphthalenedicarboxylic acid (NAD)
adipic acid (ADP)
1,7-heptane dicarboxylic acid (HPC)
1,10-decane dicarboxylic acid (DCD)

The results of the measurements carried out on these polymers are given in the table below.

| Polymer having for a recurring unit | TGA loss of weight 0% at temp. in °C. | TGA loss of weight 10% at temp. in °C. | DSC in °C. $T_g$ | DSC in °C. $T_m$ | DSC in °C. $T_d$ | ηrel 0,5% in DMA/LiCl |
|---|---|---|---|---|---|---|
| -K-IFT- | 316 | 400 | — | 375 | 316 | 1.30 |
| -K-TFT- | 320 | 414 | — | — | 334 | 1.24 |
| -K-TIFT | 373 | 410 | — | — | 360 | 1.24 |
| -K-PIDA- | 372 | 420 | 200 | — | 360 | 1.23 |
| -K-NAD- | 337 | 410 | 275 | — | — | 1.31 |
| -K-ADP- | 296 | 380 | 200 | — | — | 1.27 |
| -K-HPC- | 300 | 382 | 198 | 325 | — | 1.27 |
| -K-DCD- | 300 | 380 | — | 325 | — | 1.26 |
| -L-IFT | 315 | 410 | 240 | 360 | — | 1.58 |
| -L-TFT | 335 | 425 | 200 | — | 345 | 1.53 |
| -L-TIFT- | 320 | 415 | 260 | — | 325 | 1.48 |
| -L-PIDA- | 340 | 420 | 270 | — | 330 | 1.35 |
| -L-NAD- | 350 | 420 | 212 | — | 340 | 1.73 |
| -L-ADP- | 300 | 380 | 200 | 337 | — | 1.47 |
| -L-HPC- | 300 | 400 | 192 | 310 | — | 1.74 |
| -L-DCD- | — | — | 183 | 307 | — | 1.51 |
| -M-IFT- | 260 | 390 | 163 | — | 315 | 1.42 |
| -M-TFT- | 275 | 390 | 183 | — | 340 | 1.39 |
| -M-TIFT- | 300 | 400 | 198 | — | 350 | 1.38 |
| -M-PIDA- | 340 | 405 | 210 | — | 350 | 1.20 |
| -M-NAD- | 310 | 392 | 185 | 315 | — | 1.37 |
| -N-IFT- | 365 | 505 | — | 235 | 370 | 1.57 |
| -N-TFT- | 360 | 515 | — | 245 | — | 1.51 |
| -N-TIFT- | 350 | 480 | 275 | — | — | 1.48 |
| -N-PIDA- | 350 | 480 | 282 | — | — | 1.34 |
| -N-NAD- | 360 | 512 | — | — | — | 1.69 |
| -N-ADP- | 315 | 405 | — | 240 | 300 | 1.49 |
| -N-HPC- | 315 | 407 | — | 240 | — | 1.61 |

EXAMPLE XIII

Preparation of poly(esteraramid) urea

Making use of O,O'-bis[4(m-aminophenylcarbamoyl)-benzoyl] hexamethylene glycol, the preparation of which was described in Example VII (diamine A), there were prepared with 1,4-cyclohexyl diisocyanate (CHDI), p-phenylene diisocyanate (PPDI), and 4,4'-methylene bis(phenyl isocyanate) (MDI), respectively, three poly(esteraramic) urea in a nitrogen atmosphere, using dimethylacetamide as solvent.

In a 500 ml, 3-necked flask fitted with a stirrer, an inlet tube for $N_2$, a thermometer, a reflux condenser, and a dropping funnel was a solution of 29.7 g of diamine A (0.05 moles) in 200 ml of dimethylacetamide.

To this solution was slowly added dropwise a solution of 12.49 g (0.05 moles) of 4,4'-methylene bis(phenyl isocyanate) (MDI) in 75 ml of dimethylacetamide, with the temperature rising from 20° C. to 28°C.

On conclusion of the addition stirring was continued for another hour. Next, stirring was continued for four hours at 65° C., after which the solution was cooled to room temperature and subsequently poured into a very well stirred solution of 2 l of methanol. A white precipitate was formed which, after filtration and drying (over a period of 8 hours at 95° C./50 Pa), resulted in a yield of 42.8 g of the polyurea.

On repetition of the polymerization with PPDI and CHDI polymers were obtained having the following properties given in the table below.

TABLE IV

| Polymer having for a recurring unit | TGA loss of weight | | DSC in °C. | | $\eta$rel 0,5% DMA/LiCl |
|---|---|---|---|---|---|
| | 0% at temp. in °C. | 10% | $T_g$ | $T_d$ | |
| -A-MDI- | 255 | 310 | — | 255 | 1.26 |
| -A-PPDI- | 255 | 310 | — | 255 | 1.38 |
| -A-CHDI- | 260 | 325 | 125 | 255 | 1.12 |

EXAMPLE XIV

Preparation of poly(esteraramid) imide

To a solution of 14.85 g (0.025 moles) of O,O'-bis[4(m-aminophenylcarbamoyl]benzoyl) hexamethylene glycol, the preparation of which is described in Example VII (diamine A), in 100 ml of dimethylacetamide (dried on Molecular Sieves 3Å) were added with stirring in an N$_2$ atmosphere over a period of 3 minutes, use being made of a powder metering apparatus, 8.05 g (0.025 moles) of benzophenone dianhydride. Following after flushing with 50 ml of dimethylacetamide the temperature slowly rose to 32° C., with the viscosity of the clear, light yellow solution increasing rapidly. After 2 hours' stirring at room temperature a relative viscosity of 1.78 was measured on a 1.1 wt.% solution in dimethylacetamide at 25° C., which corresponds to $\eta_{inh}=0.52$. Of the polyamic acid solution 21 ml was poured onto a glass plate of 540 cm$^2$. After drying for 90 minutes in open air at 65° C. a light yellow film was obtained. This film was slowly heated in a forced-draught furnace over a period of 4 hours from 60° C. to 215° C. The resulting polyimide film was yellow, flexible, and transparent. For the glass transition temperature a value of 210° C. was measured; the decomposition temperature was found to be 325° C.

We claim:

1. A polymer obtained by reacting a diamine of the formula

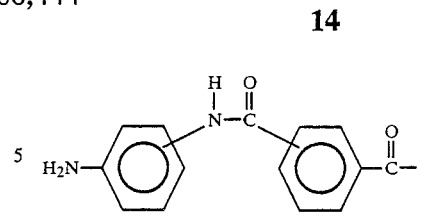

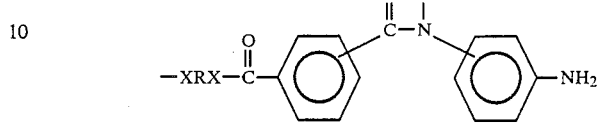

wherein X=NH or O and R is a divalent, substituted or unsubstituted organic group having at the most 20 carbon atoms with a difunctional organic compound selected from the group consisting of diacids, diacid chlorides, aromatic carboxylic anhydrides and diisocyanates.

2. A polymer according to claim 1, wherein the difunctional organic compound is a diacid or diacid chloride of the formula A—Q—A, wherein A is a carboxyl group or a carbonyl chloride group and Q is a divalent organic group with 2-40 carbon atoms.

3. A polymer according to claim 2, wherein Q is a m- or p-phenylene group, an alkylene group having 2-8 carbon atoms or a cyclohexylene or dimethylene cyclohexylene group.

4. A polymer according to claim 2, wherein X is —O—.

5. A polymer according to claim 2, wherein X is —NH—.

6. A polymer according to claim 1, wherein the difunctional organic compound is an aromatic carboxylic anhydride having 9-24 carbon atoms.

7. A polymer according to claim 6, wherein the carboxylic anhydride is selected from the group consisting of trimellitic acid anhydride, pyromellitic acid dianhydride and benzophenone tetracarboxylic acid dianhydride.

8. A polymer according to claim 6, wherein X is —O—.

9. A polymer according to claim 6, wherein X is —NH—.

10. A polyimide obtained by heating a polymer according to claim 6 at a temperature in the range of 150°-300° C.

11. A polyimide obtained by heating a polymer according to claim 7 at a temperature in the range of 150°-300° C.

12. A polymer according to claim 1, wherein the difunctional organic compound is a diisocyanate of the formula OCN—Q—NCO, wherein Q is a divalent organic group having 2-20 carbon atoms.

13. A polymer according to claim 12, wherein X is —O—.

14. A polymer according to claim 12, wherein X is —NH—.

* * * * *

UNITED STATES PATENT AND TRADEMARK OFFICE
CERTIFICATE OF CORRECTION

PATENT NO. : 4,980,444
DATED : December 25, 1990
INVENTOR(S) : Cornelis R. H. I. DE JONGE et al It is certified that error appears in the above-identified patent and that said Letters Patent is hereby corrected as shown below:

Col. 6, line 65, change "(4,2 moles)" to --4.2 moles--.

Col. 11, in Table I, line 3, change "(0,5%)" to --(0.5%)--.

Col. 12, in the Table, line 24, change "(0,5%)" to --(0.5%)--.

Col. 13, in Table IV, line 19, change "(0,5%)" to --0.5%)--.

Signed and Sealed this

Nineteenth Day of May, 1992

Attest:

DOUGLAS B. COMER

*Attesting Officer*  *Acting Commissioner of Patents and Trademarks*